United States Patent Office 2,839,517
Patented June 17, 1958

2,839,517

POLYPROPENYLBENZENE

Lester S. Cohen and Joseph R. Zietz, Jr., Baton Rouge, La., assignors to Ethyl Corporation, New York, N. Y., a corporation of Delaware No Drawing. Application August 3, 1953
Serial No. 372,186

4 Claims. (Cl. 260—93.5)

This invention relates to a new composition of matter and more particularly to an improved plastic material suitable for molding, extruding, casting, coatings, electrical insulation, and the like.

It is an object of this invention to provide a new composition of matter. Another object is to provide an improved plastic which is solid, hard, and has exceptional heat stability, and a very high melting point. Another object is to provide a plastic composition which is moldable, extrudable, and which is capable of being processed into castings, coatings, molding, and similar products.

Polypropenylbenzene (beta-methylstyrene) is a well known compound. The homopolymerization of this compound has previously been reported (Annalen der Chemie 517, 73–104). This polymerization product however, as reported, had extremely low molecular weight and was of no particular commercial value. The average molecular weight of the product of this prior process was only about 1,000 and the highest fraction had a molecular weight of not greater than 2,000. This latter fraction was only 10 percent by weight of the total polymerization product and had a melting point between 155° and 162° C.

We have found that polypropenylbenzene having a molecular weight of above about 2500 has considerable improved properties over the lower molecular weight homopolymer heretofore known. For example, the melting point of the prior homopolymer, having a molecular weight of about 2000, has a melting point as noted above of between 155° and 162° C. The whole polymer mixture from which this higher molecular weight fraction was obtained had a melting point of only about 100° C. In contrast, a polymer in accordance with this invention, having an average molecular weight above about 2500, has a melting point above about 250° C. and frequently considerably higher. In addition, the polypropenylbenzene of this invention has strength and other physical properties which are considered improved over the prior known polypropenylbenzene polymers.

The molecular weight of the homopolymer largely determines the physical properties of the final polymer. In general, higher molecular weights materially improve the heat stability and increase the melting point of the polymer. Also, higher molecular weight improves the resistance of the polymer to organic solvents, acids and bases.

The homopolymer can be prepared by an extremely active acid-type catalyst. Such catalysts include boron trifluoride at temperatures below minus 100° C. or a promoted catalyst, such as aluminum bromide and hydrobromide, also at very low temperatures. A more preferred method of preparing the homopolymer comprises carrying out the polymerization in the presence of a Friedel-Crafts catalyst and a halogenated mono-olefinic solvent which apparently acts as a synergist for the catalyst. In the latter process it is preferred to carry the process out at a temperature below about 0° C. and normally below —50° C. Suitable Friedel-Crafts catalyst are aluminum chloride, aluminum bromide, aluminum iodide, boron trifluoride and combinations of the above or combinations of the above metal halides with the corresponding hydrogen halide. Suitable halogenated mono-olefinic compounds are vinyl chloride, vinyl bromide, viniyl iodide, vinylidene chloride, vinylidene bromide, trichloroethylene (triclene), tetrachloroethylene (perclene), allyl chloride, and mixed chlorinated halogenated compounds, such as the various chloroethylenes.

The following are examples which illustrate the homopolymer of this invention, as well as methods of preparation, all quantities being given in parts by weight.

*Example I*

Boron trifluoride gas was introduced into a solution of 80 parts n-propenylbenzene in 160 parts ethyl chloride at —110° C. for 10 minutes. The mixture was removed from the bath after stirring an additional 10 minutes. The reaction mixture had a deep orange color. A solution of 40 parts methanol and 100 parts benzene was slowly added. When the color disappeared the product was transferred to a beaker and a large excess of methanol was added. The precipitated polymer was recovered by filtration, washed with methanol and dried in a vacuum at 46° C. The polymer (66 parts) had an average molecular weight of 3000.

*Example II*

A solution of 50 parts of n-propenylbenzene dissolved in 250 parts ethylchloride was cooled to —80° C. A solution of 0.5 part of liquid hydrogen bromide and 0.8 part of anhydrous aluminum bromide dissolved in 10 parts of ethyl chloride was precooled to —80° C. and added to the monomer. The polymer (18 parts) was isolated as in Example I and had a molecular weight of 2800.

*Example III*

| | Parts |
|---|---|
| Propenylbenzene | 10 |
| Ethyl chloride | 150 |
| Vinyl chloride | 10 |

The experiment was carried out by placing the above materials in a reaction vessel and cooling the same to a temperature of —110° C. Boron trifluoride was introduced into the reaction vessel from a cylinder until the solution was saturated. The reactants were continuously stirred during the addition of the catalyst. To the deep orange slurry so-formed, 25 parts of methanol and one part of ammonium hydroxide were added to destroy the excess catalyst and catalyst complex. Upon raising the temperature, the ethyl chloride vaporized and was removed from the system. The resulting white polymer was reprecipitated from a benzene solution by the addition of excess methanol. The polymer was dried at 40° C. under a vacuum of 25 inches of water for twenty-four hours. The above white powdery polymer had an average molecular weight of 3500.

We claim:

1. A hard, white polybetamethyl styrene having an average molecular weight of about 3,000 and a melting point above about 250° C., said polybetamethyl styrene being formed by polymerization of betamethyl styrene at a temperature below about —100° C. in the presence of a Friedel-Crafts catalyst selected from the group consisting of aluminum chloride, aluminum bromide, aluminum iodide and boron trifluoride.

2. The process for producing a hard, white polybetamethyl styrene having an average molecular weight of about 3,000 and a melting point above about 250° C., comprising polymerizing betamethyl styrene at a temperature below about −100° C. in the presence of a Friedel-Crafts catalyst selected from the group consisting of aluminum chloride, aluminum bromide, aluminum iodide and boron trifluoride.

3. A hard, white polybetamethyl styrene having an average molecular weight of about 3,000 and a melting point above about 250° C., said polybetamethyl styrene being formed by polymerization of betamethyl styrene at a temperature below about −50° C. in the presence of a combination of (a) a Friedel-Crafts catalyst selected from the group consisting of aluminum chloride, aluminum bromide, aluminum iodide and boron trifluoride, with (b) a synergistic amount of a halogenated mono-olefin selected from the class consisting of vinyl chloride, vinyl bromide, vinyl iodide, vinylidene chloride, vinylidene bromide, tri-chloroethylene, tetrachloroethylene and allyl chloride.

4. The polybetamethyl styrene of claim 1 in which the polymerization is also carried out in the presence of a synergistic amount of vinyl chloride.

References Cited in the file of this patent
UNITED STATES PATENTS 2,694,054     Thomas et al. _____ Nov. 9, 1954

FOREIGN PATENTS 743,302     France _____ Jan. 6, 1933

OTHER REFERENCES

Ellis, "Chem. of Synthetic Resins," vol. I, page 258, Reinhold (1935).

Staudinger, Ann. 517 (1935).